US007877783B1

(12) United States Patent
Cline et al.

(10) Patent No.: US 7,877,783 B1
(45) Date of Patent: Jan. 25, 2011

(54) SYSTEM AND METHOD FOR SECURE COMMUNICATIONS WITH A REMOTE SOFTWARE PROGRAM

(75) Inventors: Troy Lee Cline, Leander, TX (US);
Ivelin Atanasov Ivanov, Austin, TX (US)

(73) Assignee: BMC Software, Inc., Houston, TX (US)

( * ) Notice: Subject to any disclaimer, the term of this patent is extended or adjusted under 35 U.S.C. 154(b) by 1012 days.

(21) Appl. No.: 10/241,879

(22) Filed: Sep. 12, 2002

Related U.S. Application Data

(60) Provisional application No. 60/335,604, filed on Nov. 15, 2001.

(51) Int. Cl.
*G06F 7/04* (2006.01)
(52) U.S. Cl. ........................................................ 726/2
(58) Field of Classification Search ...................... 726/2, 726/27; 709/220, 224
See application file for complete search history.

(56) References Cited

U.S. PATENT DOCUMENTS

| | | | | | |
|---|---|---|---|---|---|
| 5,153,909 | A | * | 10/1992 | Beckle et al. | 379/265.03 |
| 5,673,322 | A | * | 9/1997 | Pepe et al. | 705/52 |
| 5,961,594 | A | * | 10/1999 | Bouvier et al. | 709/223 |
| 6,067,582 | A | * | 5/2000 | Smith et al. | 710/5 |
| 6,230,194 | B1 | | 5/2001 | Frailong et al. | |
| 6,321,250 | B1 | * | 11/2001 | Knape et al. | 709/203 |
| 6,457,054 | B1 | * | 9/2002 | Bakshi | 709/227 |
| 6,775,687 | B1 | * | 8/2004 | Binding et al. | 709/203 |
| 6,834,302 | B1 | * | 12/2004 | Harvell | 709/224 |
| 6,990,591 | B1 | * | 1/2006 | Pearson | 726/22 |
| 7,054,924 | B1 | * | 5/2006 | Harvey et al. | 709/220 |
| 2002/0147974 | A1 | * | 10/2002 | Wookey | 717/176 |
| 2002/0194289 | A1 | * | 12/2002 | Engel et al. | 709/208 |
| 2003/0061323 | A1 | * | 3/2003 | East et al. | 709/223 |
| 2003/0115340 | A1 | * | 6/2003 | Sagula et al. | 709/228 |

OTHER PUBLICATIONS

International Search Report for PCT/US02/35381 mailed May 15, 2003.
Office Action issued in Application No. EP 02789424.5 dated Aug. 29, 2007, 5 pgs.

* cited by examiner

*Primary Examiner*—Matthew B Smithers
*Assistant Examiner*—Ali S Abyaneh
(74) *Attorney, Agent, or Firm*—Sprinkle IP Law Group

(57) ABSTRACT

In one embodiment of the present invention, a messaging program at a remote computer can send a first message to a portal computer according to a one-way protocol such as HTTP. A portal program at the portal computer can receive the first message and determine if information should be sent to the portal computer. If so, the portal computer can generate a reply message that includes the information and send the reply message to remote computer on the same connection over which the first message was received. In this manner, the portal computer can send configuration control information and other information to the messaging program without requiring leased lines, dial-up connections or a VPN. Moreover, since the communication according to the one-way protocol was initiated at the remote computer, a firewall will allow the remote computer to receive the reply message.

13 Claims, 5 Drawing Sheets

SYSTEM AND METHOD FOR SECURE COMMUNICATIONS WITH A REMOTE SOFTWARE PROGRAM

RELATED APPLICATIONS

The present application claims priority under 35 U.S.C. §119(e) to U.S. provisional patent application Ser. No. 60/335,604, filed Nov. 15, 2001, entitled "Method and Apparatus for Remote Monitoring" by Troy Lee Cline and Ivelin Ivanov, which is hereby fully incorporated by reference.

TECHNICAL FIELD OF THE INVENTION

The present invention relates generally to network communications. More particularly, the present invention relates to systems and methods for secure communication of information to a remote software program over a global computer network.

BACKGROUND OF THE INVENTION

The use of computer networks to store data and provide information to users is becoming increasingly common. Many businesses, governmental organizations and other entities now maintain local area networks ("LANS") to interconnect user computers for sharing and propagation of information within the entity. Typically, each user computer (e.g., PC) or workstation connected through a LAN can utilize devices, such as printers, and access data stored on other computers connected to the LAN. For additional interconnectivity, individual LANS can connect to other LANS through Wide Area Networks ("WANS").

The largest WAN currently in existence is the Internet. The Internet is a loosely organized network of computers spanning the globe. Client computers, such as home computers or user computers located on a LAN, can connect to other clients and servers on the Internet through a regional Internet Service Provider ("ISP") that further connects to larger regional ISPs or directly to one of the Internet's "backbones." Regional and national backbones are interconnected through long range data transport connections such as satellite relays and undersea cables. Through these layers of interconnectivity, each computer connected to the Internet can potentially connect to every other (or at least a large number) of other computers on the Internet.

To isolate computers connected to the Internet through a LAN from other computers on the Internet, an entity maintaining a LAN will often implement a "firewall." A firewall can be a software and/or hardware based application that filters information coming into a LAN from the Internet (or other WAN). An entity will typically establish a firewall at each connection between the LAN and the Internet (e.g., at each T1 line) to maximize security against unwanted items (e.g., computer viruses). The firewall can implement security rules that allow only specific computers on the LAN to access the Internet and receive information from the Internet. The level of filtering, however, often depends on the protocol being used to communicate data.

Various services using different protocols can be offered over the Internet such as telnet, FTP (file transfer protocol), gopher, SMTP (simple mail transfer protocol) and world wide web services, to name a few. In some cases, any number of these services can be used by the same physical computer over different ports (i.e., world wide web content over port 80, email over port 25, etc.). Some protocols, such as FTP, allow computers to push data to other computer with a request from the receiving computer for that data. Without a firewall in place, almost any computer on the Internet could upload files and programs onto the computers on an entity's LAN, posing a serious security threat. Therefore, an entity may establish a firewall so that only one, well-monitored computer on the LAN is capable of receiving data via the FTP protocol.

Other protocols pose less of a threat, however. For example, HTTP, which is used for world wide web services, is essentially a one-way protocol. That is, a client computer, typically through the use of a web browser, must request data before the web server can send the requested data to the client computer. Thus, information received by a client computer via HTTP protocol is usually requested by the client computer. Moreover, HTTP is stateless protocol in which client and server computers do not maintain connectivity information between requests. Thus, when an HTTP request is received from a client computer, the web server opens a connection, sends a reply and closes the connection. The connection may remain persistent for a predefined duration so that multiple requests can be received (known as "pipelining"), however, when the connection is closed the web server does not generally maintain connectivity information about the client computer. The HTTP connection is typically established over port 80 or port 443 for enhanced security using secured sockets (i.e., HTTPS).

With the growth of the Internet over the past several years, entities are increasingly employing multiple LANs (typically in geographically remote locations) interconnected by the Internet. This allows, for example, a user at a Washington D.C., office to send email to a colleague in Austin, Tex. or even to print a document in Austin. To help determine the performance, efficiency and utilization of each of its LANs, an entity will often employ remote monitoring techniques. Remote monitoring can be employed to identify peak activity and aid administrators in making decisions about network growth and deployment. FIG. 1 is diagrammatic representation of a prior art remote monitoring system 100. In remote monitoring system 100, a centralized network management station 105 is connected to an entity's LANs, such as first LAN 110 and a second LAN 120, via a global computer network 130, such as the Internet. Each LAN includes one or more systems being monitored (e.g., monitored system 115 and monitored system 125) and is isolated from global computer network 130 by a firewall (e.g., firewall 135 and firewall 140, respectively). In order to monitor monitored system 115 and monitored system 125, a remote monitoring agent is deployed on each monitored system (e.g., monitoring agent 150 and monitoring agent 155). Each monitoring agent can continuously monitor statistics such as processor usage, network utilization, number of TCP/IP connections and other such statistics known to those of ordinary skill in the art.

In prior art systems such as FIG. 1, a two-way communication protocol is generally used to provide updates and new configuration information to the remote monitoring agents. This is generally achieved by opening an additional port at the respective firewall and allowing communications over that port via a virtual private network ("VPN"). The opening of additional ports through the firewall provides additional points of entry to the corresponding LAN, thereby potentially decreasing overall security. Other prior art systems provide connectivity through a secure leased line, such as ISDN lines 160 and 165, connected to each monitored system, essentially bypassing global computer network 130. In other prior art systems, a dial-up connection is provided to the monitored systems, again bypassing global computer network 105.

These prior art systems have a number of shortcomings, however. Allowing access from VPN, leased line, or dialup access usually entails additional hardware, software and/or phone charges that may not be financially feasible for smaller entities. Moreover, the establishment of a VPN or interfacing leased/dialup lines between the central management station 105 and the monitored systems can require a significant amount of time. If central management station 105 is administrated by a different entity than LAN 110 and LAN 120, a representative of the management entity will typically have to make one or more on-site visits to the locations of monitored system 115 and monitored system 125 to install software and/or hardware, and to reconfigure the firewall, again leading to additional time and expense.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

SUMMARY OF THE DISCLOSURE

Figure 1:
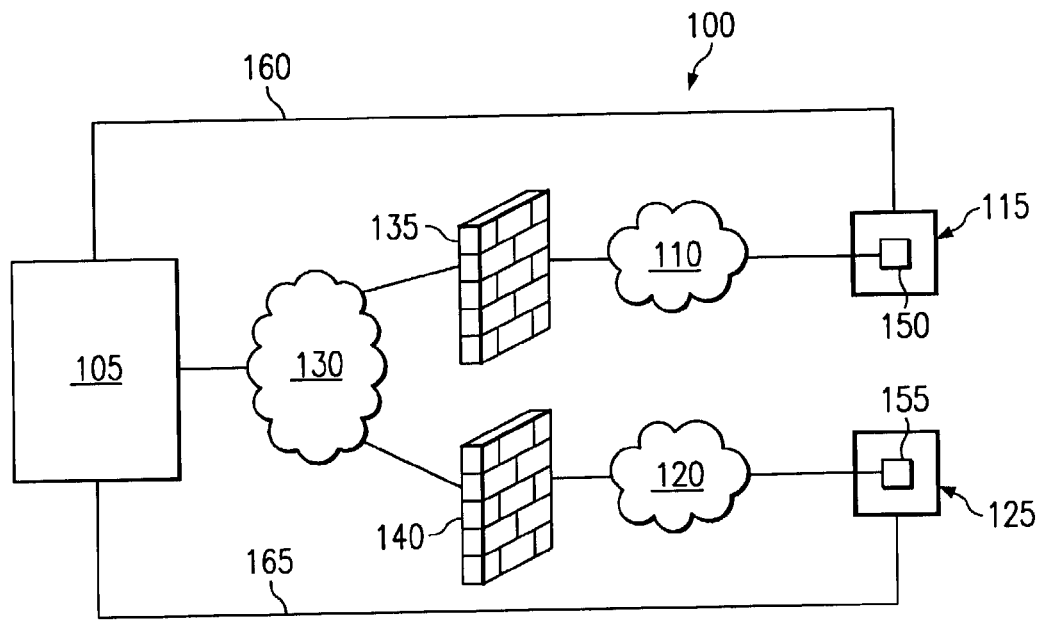
FIG. 1 is a diagrammatic representation of a prior art system for remote monitoring.

The present invention provides a secure communications system and method that eliminates or substantially reduces disadvantages associated with previously developed communications systems and methods.

One embodiment of the present invention comprises a remote computer and a portal computer connected via a global computer network. The remote computer can include a remote computer processor and a remote computer readable storage medium storing a messaging program. The messaging program can be executable by the remote computer processor to compose and transmit a message according to a one-way protocol. In one embodiment of the present invention, the message can include data collected by a processing program (e.g., a remote monitoring agent or other systems management software program known to those of ordinary skill in the art) and can be transmitted according to a one-way protocol that is the HTTP protocol.

The portal computer can include a portal computer processor and a portal computer readable storage medium storing a portal program. The portal program can be executable to: (i) receive the message transmitted by the remote program; (ii) compose a reply message to include a set of information destined for a remote software agent; and (iii) communicate the reply message to the remote computer according to the same one-way protocol. In one embodiment of the present invention the reply message can include configuration command information that can be used by the messaging program or by the processing program to collect and send data to the portal computer.

Another aspect of the present invention can be characterized as a system for communication of configuration information comprising a set of instructions that are executable by multiple computer processors to: (i) transmit a message from a remote computer to a portal computer according to a one-way protocol; (ii) receive the message at the portal computer; (iv) determine if configuration control information should be sent to the remote computer; (v) if configuration control information should be sent to the remote computer, transmit a reply message to the remote computer from the portal computer according to the one-way protocol, the reply message including the configuration control information; and (vi) receive the reply message at the remote computer.

Yet another aspect of the present invention can be characterized as a method for secure communication of configuration information comprising the steps of (i) transmitting a data message from a remote computer to a portal computer according to a one-way protocol; (ii) receiving the data message at the portal computer; (iii) determining if configuration control information should be sent to the remote computer; (iv) if configuration control information should be sent to said remote computer, transmitting a reply message to the remote computer from the portal computer according to the one-way protocol, the reply message including the configuration control information; and (v) receiving the reply message at the remote computer.

Embodiments of the present invention provide an advantage over prior art systems and methods of communicating configuration information to a remote software programs because embodiments of the present invention leverage existing network architectures to allow secure communication without the use of expensive leased lines or dial-up connections to access the remote software program. Furthermore, embodiments the present invention provide an advantage by eliminating (or substantially reducing) the configuration time required to implement access through a leased line, a dial-up connection or a VPM.

Embodiments of the present invention provide another advantage over prior art systems and methods by allowing configuration control information to be sent to a remote software program through a portal program. This can allow configuration control information to be entered from anywhere on a global computer network without requiring direct access to the remote software program.

Moreover, embodiments of the present invention provide yet another advantage over prior art systems by leveraging existing one-way communications protocols. This allows embodiments of the present invention to communicate configuration control information through commonly open ports in a firewall, thereby reducing or eliminating the amount of time necessary to reconfigure the firewall.

DETAILED DESCRIPTION OF THE INVENTION

Preferred embodiments of the present invention are illustrated in the FIGUREs, like numerals being used to refer to like and corresponding parts of the various drawings.

Embodiments of the present invention provide a system for the secure communication of configuration control information to a remote software program. One embodiment of the present invention includes a messaging program located at a remote computer and a portal program located at portal computer. The messaging program can receive data from a processing program, which can be located at the same computer as or a different remote computer from the messaging program, and formulate a first message that includes the received data. The messaging program can then transmit the data message to the portal computer using a "one-way protocol." For purposes of this application a "one-way protocol" is a protocol in which communications must typically be initiated at a client computer, in this case the remote computer, before a second computer (e.g., a server computer) can send a response according to the protocol over the same connection. An example of a one-way protocol is HTTP as information cannot be pushed to the client computer using the HTTP protocol without a corresponding request initiated at the client computer. Using HTTP a client computer, usually through a web browser, makes an HTTP request to a server. In doing so, the client establishes a connection to the server by opening a socket to port 80 on the server, as would be understood by those of ordinary skill in the art. It should be noted that this connection is not a direct connection in that the connection between the client computer and server may involve multiple servers on the Internet to route requests. In response to the HTTP request, the web server typically sends back data (e.g., web page content) over the connection (e.g., the socket in port 80) initiated by the client computer and closes the connection. Thus, the web server maintains the connection established by the client computer long enough to send a reply then closes the connection until an additional request is received. HTTP is a one-way protocol because the server can not typically push the web page contents to the client computer without the client computer first establishing the connection to the web server. It should be noted, however, that a "one-way protocol" can be bi-directional. In the case of HTTP, for example, once a connection is opened due to a client request, the web server may send data, usually in the form of web page content, back to the client computer.

In one embodiment of the present invention, upon receipt of a first message (e.g., an HTTP request) from the messaging program on the remote computer, the portal program can maintain the connection established by the client computer (e.g., a socket in port 80 in the case of HTTP) and determine if configuration control information (or other information) should be sent to the remote computer.

If so, the portal program formulate a reply to the data message that includes the configuration control information (or other information that the portal computer needs/wishes to send to the remote computer), transmit the reply message to the remote computer according over the connection established by the remote computer (e.g., over the socket in port 80) and close the connection. The messaging program at the remote computer can extract the configuration control information from the reply message and perform various tasks according to the configuration control information. Additionally, the messaging program can forward the configuration control information to a processing program, such as a remote monitoring agent, which can also perform tasks according to the configuration control information.

In one embodiment of the present invention, the portal computer can send out a reply message every time a first message is received from the remote computer acknowledging receipt of the first message. The reply message can be sent over the connection established by the remote computer in order to transmit the first message. In the case of HTTP, this connection can comprise a socket in port 80, as would be understood by those of ordinary skill in the art. When configuration control information is to be sent to the remote computer, the configuration control information, or any other information, can be appended to the reply message in addition to any status bits acknowledging receipt. In this way, the configuration control information can be "piggybacked" on the HTTP reply that would have been sent in any event over the existing connection. As the portal computer uses the existing connection established according to the one-way protocol to communicate configuration control information, no additional connections between the remote program and the portal must be opened in order for the portal to communicate with the remote program. Portal to remote program communication can be done by attaching the communication to the response that may already be sent out (e.g., a reply message acknowledging receipt of a first message from the remote computer). In one embodiment of the present invention, the portal computer can close the connection once the reply message has been sent.

Because a one-way protocol is used to send data and reply messages, communication is initiated at the remote computer. Therefore, a firewall at the remote computer will typically allow a connection to be established between the messaging program and the portal program. In the case of HTTP, for example, this can be done over "port 80," as would be understood by those of ordinary skill in the art. As the firewall will not block the communication between the remote computer and the portal computer, the portal program can send configuration control information to the messaging program without requiring additional handshaking or reconfiguration of the firewall. Thus, the messaging program and portal program can communicate using existing network architectures and protocols. In this manner, the messaging program and any processing program to which the messaging program can communicate configuration control information (e.g., a software agent) can be updated without reconfiguring the firewall and without the need for leased lines, dial-up connections or a VPN between the portal computer and the remote computer.

Figure 2:
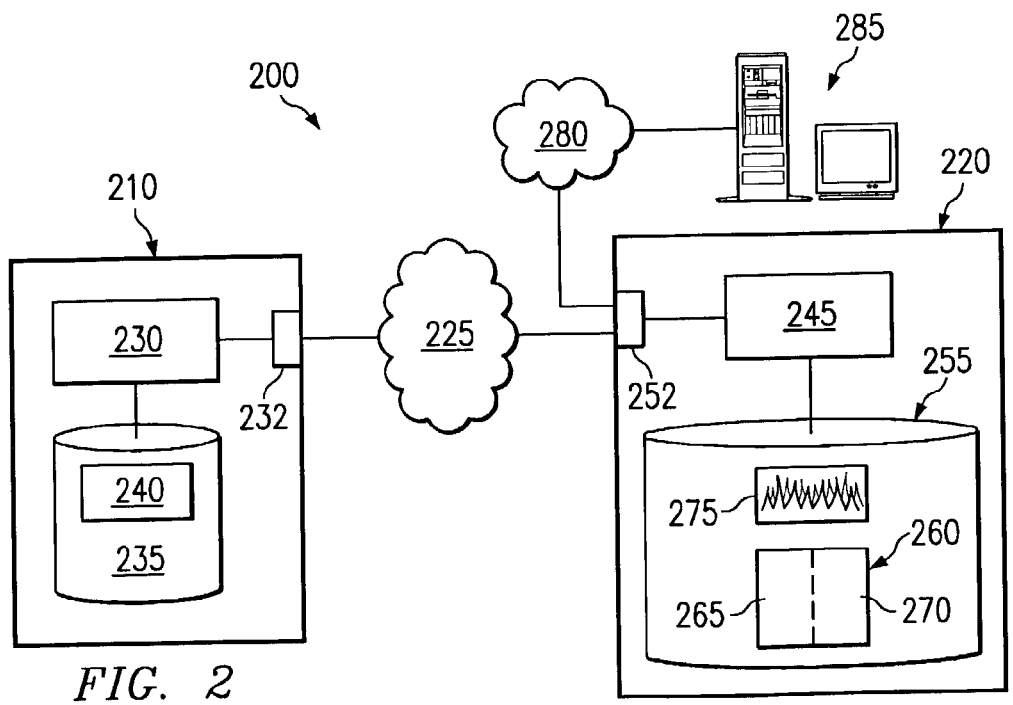
FIG. 2 is a diagrammatic representation of a system for secure communication with a remote software program according to one embodiment of the present invention.

FIG. 2 is a diagrammatic representation of a secure communication system 200 according to one embodiment of the present invention. System 200 can comprise a portal computer 210 having a central processing unit 230 (CPU 230), a computer readable storage medium 235 (e.g., RAM, ROM, fixed disk, removable disk, magnetic storage device, optical storage device or any other computer readable memory known in the art) storing a set of portal software instructions 240 ("portal program 240") and a network communication device 232 (e.g., an Ethernet adapter, NIC or any other network communication device that would be known to those of ordinary skill in the art). It should be noted that although portal computer 210 is shown as a single unit in FIG. 1 and portal instructions 240 reside on that unit, portal computer 210 can comprise multiple computers and portal program 240 can be distributed among them.

Portal computer 210 can communicate with a remote computer 220 via a global computer network 225 (e.g., the Internet, a wireless network, or other computer network as would be known to those of ordinary skill in the art). Remote computer 220 can include an central processing unit 245 (CPU 245) and a computer readable storage medium 255 (e.g., RAM, ROM, fixed disk, removable disk, magnetic storage device, optical storage device or any other computer readable memory known in the art) storing a set of remote computer instructions 260 ("remote program 260") and a software firewall 275. In one embodiment of the present invention remote program 260 can comprise a messaging program 265 and a processing program 270. As with portal program 240, remote program 260 can be distributed among multiple remote computers 220. Remote computer 220 can also include a network interface device 252 (e.g., an Ethernet adapter, a NIC, or any other network interface device known in the art). In addition to connecting to portal computer 210 through global computer network 225, remote computer 220 can connect to other local networked computers, such as system computer 285 (e.g., mainframe, server, workstation, PC or other computer configured for network communication known in the art) through local area network (LAN) 280.

In the embodiment of FIG. 2, remote computer 220 acts as a "gateway" between global computer network 225 and LAN 280. Data passing between LAN 280 and global computer network 225 will typically be subject to the rules established for firewall 275. For example, if firewall 275 is configured to filter out FTP requests from computer outside of LAN 280, FTP requests originating from other computers (including portal computer 210) connected to global computer network 225 will be blocked. Thus, firewall 275 filters the data traffic between global computer network 225 and LAN 280. As would be understood by one of ordinary skill in the art, firewall 275 can be configured to allow HTTP requests originating from computers on LAN 280 (e.g., from system computer 285 or remote computer 220) to pass through to global computer network 225 and to allow receipt of corresponding replies, thereby providing users of system computer 285 with access to the World Wide Web. Thus, the port upon which HTTP requests are communicated (e.g., "port 80") is a an open port in firewall 275.

Configuration of firewalls to include open ports (or sockets within those ports) for certain types of data transmissions is well-known in the art. It should be noted that firewall 275, as shown in FIG. 2, is a software firewall. However, in other embodiments of system 200, firewall 275 can be a hardware firewall or a combination of both. Moreover, while firewall 275 and remote program 260 are illustrated as being co-located, they can be distributed. For example, remote program 260 can reside at system computer 285 (e.g., system computer 285 can be the remote computer) or can be distributed among several system computers.

Remote program 260 can be deployed on remote computer 220 for any function for which a software program is suitable. For the sake of explanation, remote program 260 will be described as comprising a messaging program 265 and a processing program 270, though it should be understood that messaging program 265 and processing program 270 can comprise the same set of computer executable instructions, can comprise separate sets of computer executable instructions, can be subroutines of a larger software program, or can be implemented in any other manner as would be understood by those of ordinary skill in the art.

Processing program 270 can carry out various tasks such as monitoring system computer 285, monitoring the capacity of LAN 280, collecting data from system computer 285 and/or remote computer 220 or other tasks. For purposes of the present application, processing program 270 will be discussed primarily in terms of a remote monitoring agent, however this is not limiting of the present invention, and processing program 270 can carry out any task for which it is programmed. In one embodiment, data collected by processing program 270 can be passed to messaging program 265 for delivery to portal computer 210. Messaging program 265 can format the data into a data message for transmission according to a one-way protocol, such as HTTP. For example, messaging portion 265 can format a set of systems information received from processing portion 270 into an HTTP request and send the HTTP request to portal computer 210.

Because communications conducted according to one-way protocols originate at the client computer (e.g., remote computer 220), firewall 275 can be configured to allow the data message to pass to global computer network 225. In the case of HTTP, for example, firewall 275 will generally have a commonly open port (e.g., "port 80") that allows HTTP requests to pass to global computer network 225. If another one-way protocol is used, firewall 275 can be similarly configured to allow data messages according to the selected one-way protocol to pass through the firewall, though the use of HTTP can reduce configuration costs as "port 80" is commonly open in most firewalls.

Upon receipt of the data message from remote program 260, portal program 240 can determine if information (e.g., configuration control information or other information) should be sent to remote program 260. In the case of a remote monitoring system in which processing program 270 comprises a remote monitoring agent, for example, such configuration control information may include how often processing program 270 collects data, changes in the tasks assigned to processing program 270 and so on. If portal program 240 determines that configuration control information (or other information) should be sent to agent computer 220, portal program 240 can maintain the connection established by the remote computer (e.g., a socket in port 80), generate a reply message that includes the configuration control information (or any other information) and transmit the reply message to remote computer 220 according to the one-way protocol over the connection established by remote computer 220 when sending the original data message. In the case of HTTP, the reply can comprise an HTTP reply containing the configuration control information destined for remote computer 220. To more efficiently utilize bandwidth, the configuration control information can be embedded in the HTTP reply as XML commands.

Because the reply message adheres to the one-way protocol and is transmitted over the connection established by the transmittal of the data message (i.e., the connection established by remote computer 220), firewall 275 will allow the reply message to pass to remote program 260. This can occur because the port (or socket within the port) across which the reply message is communicated (e.g., "port 80" in the case of HTTP) is either commonly open, as is typically the case with "port 80," or because the firewall is configured to allow requests and replies according to the one-way protocol being utilized to pass. As will be discussed in greater detail in conjunction with FIGS. 3 and 4, messaging program 265 can receive and process the reply message and can store any configuration control information (or other information) at client computer readable memory 255. Additionally, messaging program 265 can pass configuration information and commands to processing program 270 for storage and/or execution.

In addition to formulating a data message that carries data to portal computer 210, messaging program 265 can transmit heartbeat messages and status messages to portal computer 210. The heartbeat message can be a message that is transmitted according to a predetermined schedule so that portal computer 210 can expect to receive a heartbeat message within a certain period of time. Again, the heartbeat message can be formulated according to a one-way protocol, such as HTTP. The failure to receive a heartbeat message at portal computer 210 within the scheduled period of time can indicate connectivity problems with remote computer 220 or other technical problems. As an example of a heartbeat message, messaging program 265 can send an HTTP request to portal computer every 10 minutes. If portal computer 210 does not receive a particular scheduled heartbeat message, portal program 240 can attempt to notify users of remote computer 210 (and system computer 285 on LAN 280) of a potential technical difficulty involving remote program 260.

Such notification can occur by email, for example. Thus the heartbeat message ensures that portal program 240 is aware of any connectivity problems with agent 270 that may arise. Moreover, as with a data message, portal program 240 can send a reply to the heartbeat message using the one-way protocol (e.g., HTTP). Similar to a data message, a status message can be used to communicate data about the state of remote program 260. Again, the status message can be communicated according to the one-way protocol.

It should be noted that portal program 240 can respond to every data message, heartbeat and/or status message with a reply indicating that the message was received. The reply message can contain status bits indicating that the first message (e.g., data message, heartbeat message, status message or other message from remote program 260) was received from remote program 260 and can include appended configuration control information when configuration control information needs to be sent to remote computer 220. Alternatively, portal program 240 can send a reply to a data message, status message or heartbeat message only when configuration control information needs to be sent to remote program 260. It should be further noted that in cases in which sensitive information, such as user names and passwords, are communicated to remote program 260 within reply message, a more secure one-way protocol, such as HTTPS, can be utilized to send the reply message.

Because one-way protocols typically only allow data to be pushed to a computer in response to a request from that computer, configuration control information, in one embodiment of the present invention, will generally only be sent to remote program 260 in response to a first message originating at remote program 260. Therefore false or malicious data (or commands) can only be sent to remote program 260 from other computers located on global computer network 225 if a first message from remote program 260 is intercepted. Due to the amount of data that can travel global computer network 225, however, interception of a particular message is highly unlikely. Moreover, any malicious reply would have to be formatted in a manner that could be processed by remote program 260, requiring detailed knowledge of the implementation of remote program 260.

In addition to providing a secure method of communicating configuration control information to a remote software program, embodiments of the present invention provide a highly efficient mechanism for reconfiguring remote program 260. In one embodiment of the present invention a user, typically associated with remote computer 220 (e.g., a system administrator for LAN 280) can log onto portal computer 210 from virtually any computer connected to global computer network 225 and can provide configuration information to portal program 240. This can be achieved through a web browser or other manner as would be known to those of ordinary skill in the art. When portal program 240 receives the next data message or heartbeat message (e.g., an HTTP request) from remote program 260, portal program 240 can maintain the connection established by remote program 260, and can send a reply (e.g., an HTTP reply) to remote program 260 that includes the new configuration control information over that connection. After the reply message has been sent, portal program 240 can close the connection. In this manner, an administrator can configure remote program 260 from virtually anywhere in the world without requiring the user (e.g., the system administrator) to log directly onto remote computer 220. Thus, an administrator in Rome, Italy could configure a remote monitoring agent in Austin, Tex. by sending configuration information to portal computer 210 over the Internet.

Additionally, embodiments of the present invention eliminate (or at least substantially reduce) the costs and extra hardware associated with leased lines or VPNs. As remote program 260 can receive configuration information and commands via global computer network 225, additional hardware is not required to reconfigure remote program 260. Embodiments of the present invention can thus leverage existing network architectures (e.g., the Internet) and protocols (e.g., HTTP) to communicate configuration information and commands to a remote software program (e.g., remote program 260) without requiring cumbersome security procedures or hardware.

Figure 3:
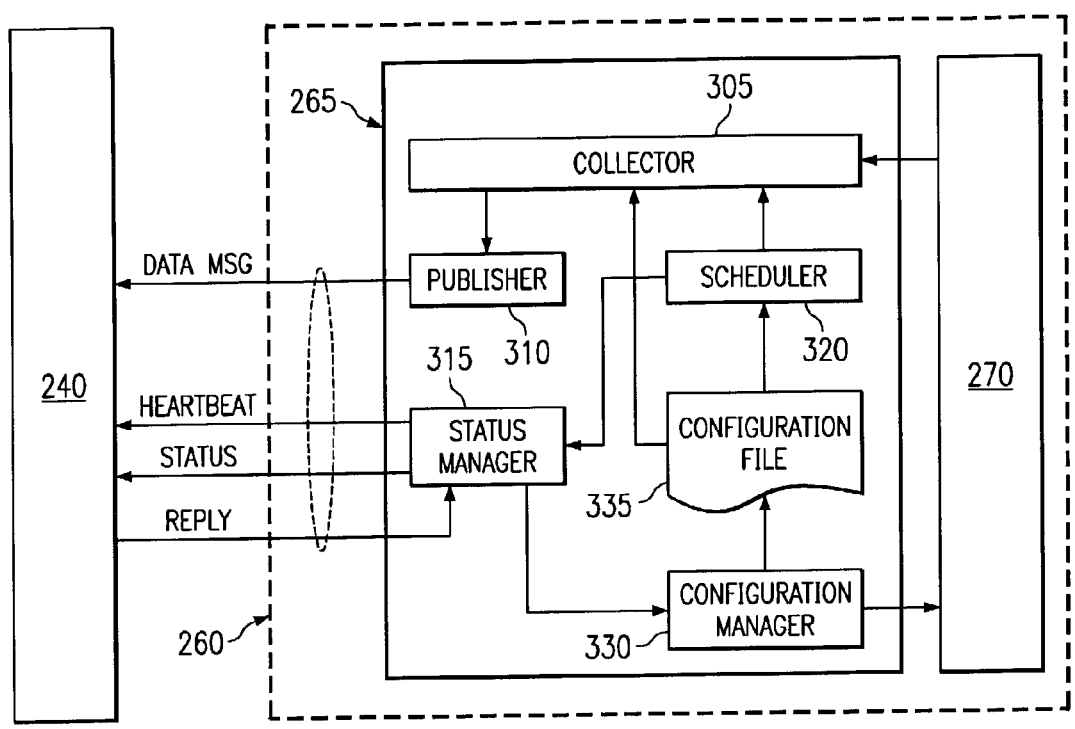
FIG. 3 is a diagrammatic representation of an architecture emphasizing the architecture of a messaging program according to one embodiment of the present invention.

FIG. 3 is a diagrammatic representation of one embodiment of a software architecture including portal program 240 and a remote program 260 having messaging program 265 and processing program 270. As noted previously, messaging program 265 and processing program 270 can comprise the same computer program or be separate computer programs. As illustrated in FIG. 3, one embodiment of messaging program 265 can comprise software instructions/programs corresponding to a collector 305, a publisher 310, a status manager 315, a scheduler 320 and a configuration manager 330. In the embodiment of FIG. 3, collector 305 receives data from processing program 270. If processing program 270 comprises a remote monitoring agent, for example, the data received by collector 305 can comprise network utilization data (e.g., for LAN 280), CPU utilization data, memory utilization data, packet drop data or other systems monitoring data as would be understood by those of ordinary skill in the art. Collector 305 can collect data from processing program 270 according to a schedule propagated by scheduler 320. Alternatively, collector 305 can continuously receive data from processing program 270 or can receive data when processing program 270 determines that data should be sent to portal program 240 (i.e., processing program 270 can, in one embodiment of the present invention, push data to collector 305).

In addition to sending regularly collected data to messaging program 265, processing program 270, in one embodiment of the present invention, can send events to collector 305. Processing program 270 can generate these events according to predefined rules, as might occur, for example, if network utilization exceeds 95%. In this case, processing program 270 can generate an event and send the event to collector 305. Events can be given a higher priority for communication to portal program 240 than other forms of data.

Publisher 310 can then format the data and/or events collected by collector 305 according to a one-way protocol. For example, publisher 310 can formulate a data message comprising an HTTP request containing the data from collector 305. Additionally, publisher 310 can include a remote program identifier so that portal program 240 knows from which remote program a message is being received. Publisher 310 can initiate a connection with portal program 240 by transmitting the data message in accordance with the one-way protocol. Portal program 240 can then optionally reply to the status manager 315 according to the one-way protocol over the connection established by remote program 260. It should be noted that the formulation and routing of messages (e.g., requests and replies) according to one-way protocols, such as HTTP, is understood by those of ordinary skill in the art.

In addition to publisher 310 sending data messages to portal program 240, status manager 315 can send heartbeat messages and status messages to portal program 240. The heartbeat message can comprise a message sent according to a predefined schedule to portal computer 210. Similar to a data message, a heartbeat message can be formatted according to a one-way protocol, such as HTTP. Thus, status manager 315 can send HTTP requests to portal computer 210 according to a schedule that, in one embodiment of the present invention, can be propagated by scheduler 320. Portal program 240 can then optionally send a reply, which can contain configuration control information, to messaging program 265 according to the one way protocol over the connection established by remote program 260. After a reply message has been sent, remote program 240 can close the connection until a new connection is established by remote program 260 by sending, for example, a new first message (e.g., a data message, heartbeat message or status message).

The heartbeat message can serve at least two functions. First, since one-way protocols typically require that communications be initiated by the client computer, the heartbeat message provides a mechanism for messaging program 265 to initiate communication with portal program 240 even when messaging program 265 has no collected data to send. This allows portal program to optionally send a reply containing configuration control information without having to wait for the next data message. Moreover, since status manager 315 can send heartbeat messages to portal program 240 according to a predefined schedule, portal program 240 can expect heartbeat messages according to the schedule. A failure to receive a heartbeat message according to the schedule can indicate a connectivity problem.

Status manager 315 can also format and send status messages (including a remote program identifier), such as startup messages and shutdown messages. A startup message, for example, can be sent to portal program 240 when remote program 260 is initially installed on remote computer 220. The startup message can include any information that may be pertinent when remote program 260 is first initialized, such as registration information. Status manager 315 can also send a shutdown message when remote program 260 is shutting down for a period of time. The shutdown message can alert portal program 240 not to expect additional heartbeat messages and can include any other information to be sent before remote program 260 shuts down. In addition, status manager 315 can send other startup messages that include the state of messaging program 265 or processing program 270.

In response to a first message sent by the remote computer (e.g., a data message, a heartbeat message, a status message or any other one-way protocol message) portal program 240 can send a reply message according to the one-way protocol to the remote computer acknowledging receipt of the first message over the connection established by the remote computer to send the first message. It should be noted that in one embodiment of the present invention, portal program 240 can send a reply message to remote program 260 acknowledging receipt of each data, heartbeat and/or status message even if no configuration control information is included in the reply. If configuration control information needs to be sent to remote program 260, portal program 240 can append the configuration control information (or other information) to the reply message that was going to be sent anyway to acknowledge receipt of the first message. Alternatively, portal program 240 does not need to respond to each first message (e.g., data message, heartbeat message, status message, or other message) sent from messaging program 240. Instead, portal program 240 can respond only when configuration control information (or other information) needs to be sent to remote program 260.

In one embodiment of the present invention, portal program 240 can forward configuration control information to messaging program 265 as an HTTP reply sent in response to a data message, a heartbeat message or a status message. Thus, the HTTP reply message would contain configuration information and/or commands rather than just a standard HTTP status code acknowledging receipt of the HTTP request. Because, according to the one-way protocol (e.g., HTTP), portal program 240 can not push data to messaging program 265 in the absence of an initial communication (e.g., a first message, such as a data message, a status message or a heartbeat message) from messaging program 265, a firewall (not shown) located between messaging program 265 and portal program 240 will not typically allow the reply message to pass through to messaging program 265 if it were not sent in response to a first message originating from messaging program 265 (i.e., is not sent over a connection established from behind the firewall). However, a firewall will typically allow a reply message sent according to a one-way protocol to pass if it is sent in response to a first message initiated by a program (e.g., messaging program 265) behind the firewall. Thus, embodiments of portal program 240 can send configuration control information to messaging program 265 without reconfiguring the firewall, particularly if the one-way protocol is HTTP or HTTPS, because the configuration control information is sent over a connection established by a first message originating from messaging program 265.

It should be noted that while various examples of first messages sent by messaging program 265 (e.g., status message, data message, and heartbeat message) are shown separately in FIG. 3, they can be combined. For example, if collector 305 has data to send to portal program 240, the data can be sent out as part of the next heartbeat message (e.g., the data message and heartbeat message can be the same message). Also, depending on the one-way protocol used, the status messages, data messages, heartbeat messages and reply messages can be communicated across the same port (e.g., typically port 80 in the case of HTTP).

Status manager 315 can receive the reply message from portal program 240, can process the reply message and can forward configuration control information contained therein to configuration manager 330. The configuration control information can include, for example, the schedule at which heartbeat messages should be sent out, the types of data that processing program 270 should collect or any other configuration information or commands used by messaging program 265 or processing program 260. Based on the configuration control information received from portal program 240, remote program 260 can carry out a variety of tasks including tasks that affect the operation of remote program 260 (e.g., restarting processing program 270), tasks that affect the environment in which remote program 260 is running (e.g., reconfiguring remote computer 220 or a device, such as a printer, connected to LAN 280) and/or tasks that report on the environment in which remote program 260 is operating (e.g., checking on the status of a particular device connected to LAN 280). Configuration manager 330 can store the configuration control information in configuration file 335 or other suitable storage mechanism, such as a database, as would be understood by those of ordinary skill in the art. Data collection configuration file 335 can also include information regarding the manner in which data messages received by collector 305 should be formatted.

Figure 4:
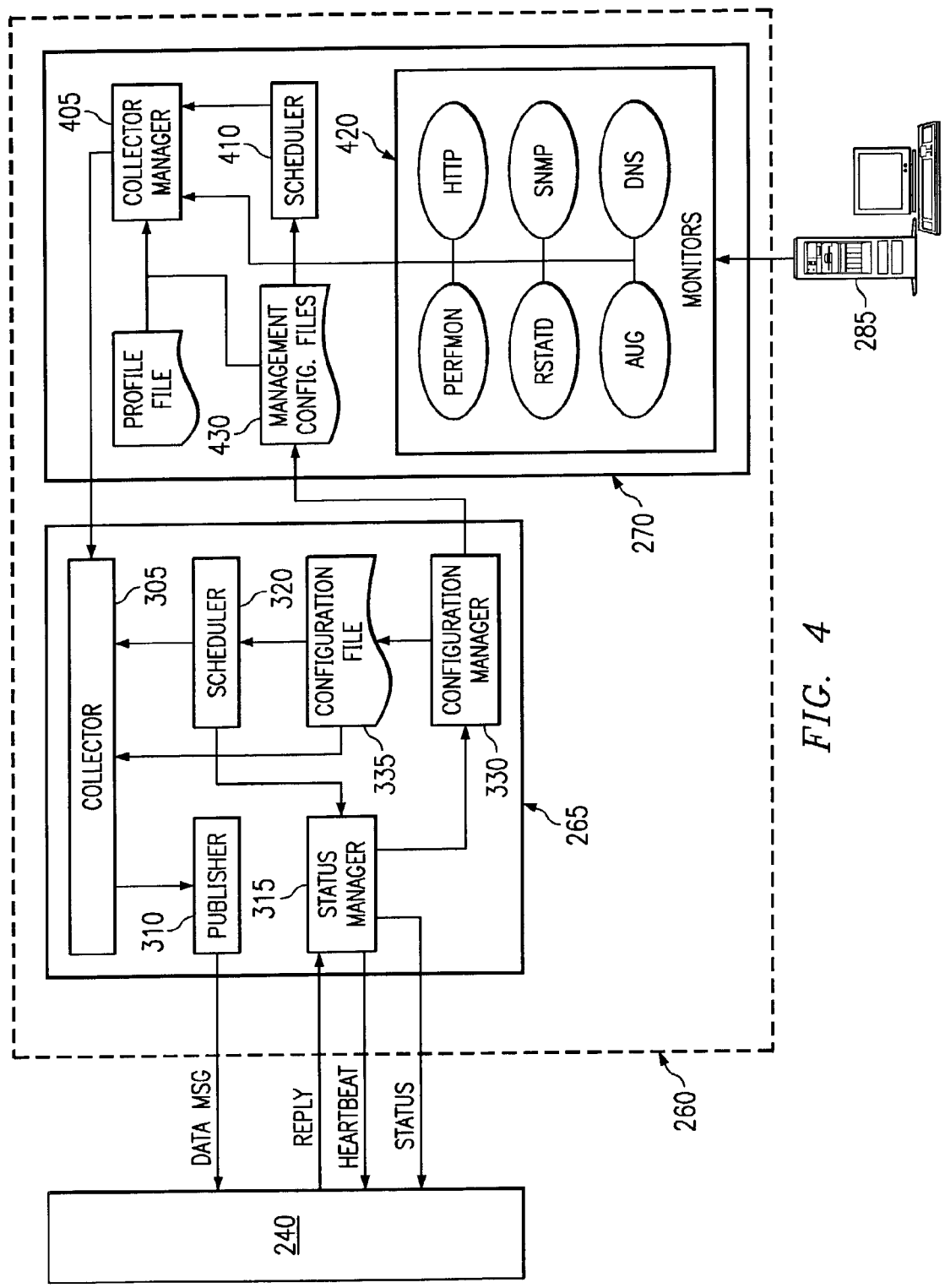
FIG. 4 is a diagrammatic representation of an architecture for a system for secure communication with a remote software program according to another embodiment of the present invention, wherein the remote software program includes a remote monitoring agent.

In FIG. 3, processing program 270 is depicted as a generic processing program 270 capable of sending data to collector 305. FIG. 4 is a diagrammatic representation of one embodiment of a software architecture in which processing program 270 comprises one embodiment of a remote monitoring agent 270. Remote monitoring agent 270, can include a collection manager 405, a scheduler 410, and monitors 420. In operation, remote monitoring agent 270 can receive configuration control information from configuration manager 330 of messaging program 265. The configuration control information can be stored in management configuration file 430 (or a database or any other suitable data storage format known to those of ordinary skill in the art). It should be noted that configuration control information that is not expected to change can be stored in a profile file 440. Again, the information stored in profile file 440 can be stored in any suitable data storage format known in the art, such as a database. Although shown separately in FIG. 4, the configuration control information stored in management configuration file 430 and profile file 440 can, in fact, be stored in the same file or database. As discussed in greater detail below, collection manager 405 can invoke an instance of a monitor 420 to collect data from system computer 285 based on the configuration control information stored in management configuration file 430 and profile file 440. Collection manager 405 can then forward the collected data to collector 305 of messaging program 265.

As an example, if system computer 285 is a UNIX system named FOXTROT, and system computer 285 is to be monitored, the configuration control information stored in management configuration file 430 (and received from portal program 240 by messaging program 265 via a reply message), can include the name FOXTROT, that FOXTROT is a UNIX system, information necessary to access FOXTROT (e.g., user name, password, if required), and a monitoring schedule for monitoring FOXTROT's activities. It should be noted that the information necessary to access FOXTROT can be determined by the access methods permitted by FOXTROT (or other device). Profile file 440, for example, can store default monitoring information for a UNIX system, such as that processing program 270 should monitor CPU and memory usage for UNIX systems and that processing program 270 should use SNMP protocol to monitor UNIX systems. Scheduler 410 can read management configuration file 430 to determine how often to monitor system computer 285 and can prompt collector manager 405 to begin monitoring system computer 285. Based on the schedule propagated by process scheduler 410, collection manager 405 can read management configuration file 430 to determine that FOXTROT should be monitored, that FOXTROT is a UNIX system, and how to connect to FOXTROT. Collection manager 405 can also read profile file 440 to determine that, since FOXTROT is a UNIX system, it should collect CPU and memory information and that it should invoke an instance of monitor 420 according to the SNMP protocol. Other examples of monitors 420 can be implemented according to Perfmon, RSTATD, PING, DNS, HTTP, HTTPS, Telnet, SQL Query or other protocols known to those of ordinary skill in the art. Remote monitoring agent 270 can collect data from system computer 285 according to the SMNP protocol, as would be understood by those of ordinary skill in the art, and forward the collected data to collector 305 of messaging program 265. Messaging program 265 can then communicate the data to portal computer 210 in a data message transmitted in accordance with a one-way protocol (e.g., HTTP). It should be noted that in this embodiment of FIG. 4, remote monitoring agent 270 does not have to be installed on the monitored computer (e.g., system computer 285). Thus, remote monitoring agent 270 can monitor multiple system computers from a single remote computer.

In the embodiment of FIG. 4, messaging program 265 has a messaging scheduler 320 and processing program 270 has a process scheduler 410. In other embodiments of the present invention messaging scheduler 320 and process scheduler 410 can comprise a single scheduler. In yet another embodiment, rather than functioning on a predefined schedule, messaging scheduler 320 and process scheduler 410 can be responsive to events external to remote program 260. For example, process scheduler 410 may prompt collector manager 405 to invoke an instance of monitor 420 at the occurrence of an external event, such as system computer 285 starting up.

Configuration control information can be sent to remote monitoring agent 270 by including the configuration control information in a reply message sent from portal program 240 to messaging program 265 in response to a first message initiated at messaging program 265. In this manner, remote monitoring agent 270 can be updated without requiring direct access to remote monitoring agent 270 (or remote computer 220) via leased line or VPN and without requiring extensive reconfiguration of the firewall. Thus, for example, a user could reconfigure remote monitoring agent 270 to switch from monitoring FOXTROT to monitoring BRAVO (or to monitoring both) without direct access to remote monitoring agent 270.

Moreover, configuration changes can be made from any computer connected to the same global computer network as portal computer 210. The new configuration command information (e.g., monitor BRAVO instead of FOXTROT) could thus be submitted from virtually anywhere in the world to portal program 240 through the use of a web browser, for example. At the receipt of the next heartbeat, data or status message from messaging program 265 according to a one-way protocol (e.g., HTTP), portal program 240 can send the new configuration command information to messaging program 265 embedded in a reply message according to the same one-way protocol (e.g., HTTP). Messaging program 265 can forward the configuration command information (e.g., monitor BRAVO) to remote agent 270 and remote agent 270 can accordingly begin monitoring BRAVO.

In the embodiment of FIG. 4, collection manager 405 invokes an instance of a monitor according to SNMP based on the configuration control information. In one embodiment of the present invention, the programming associated with implementing a monitor according to SNMP can be stored at remote computer 220 with remote monitoring agent 270. In another embodiment of the present invention, the programming associated with a monitor according to the SNMP protocol can be sent by portal program 240 to remote monitoring agent 270 in a reply message. In other words, the configuration control information sent by portal program 240 in a reply message can include a particular monitor instance. This can reduce amount of memory space required to store remote monitoring agent 270 at remote computer 220.

Figure 5:
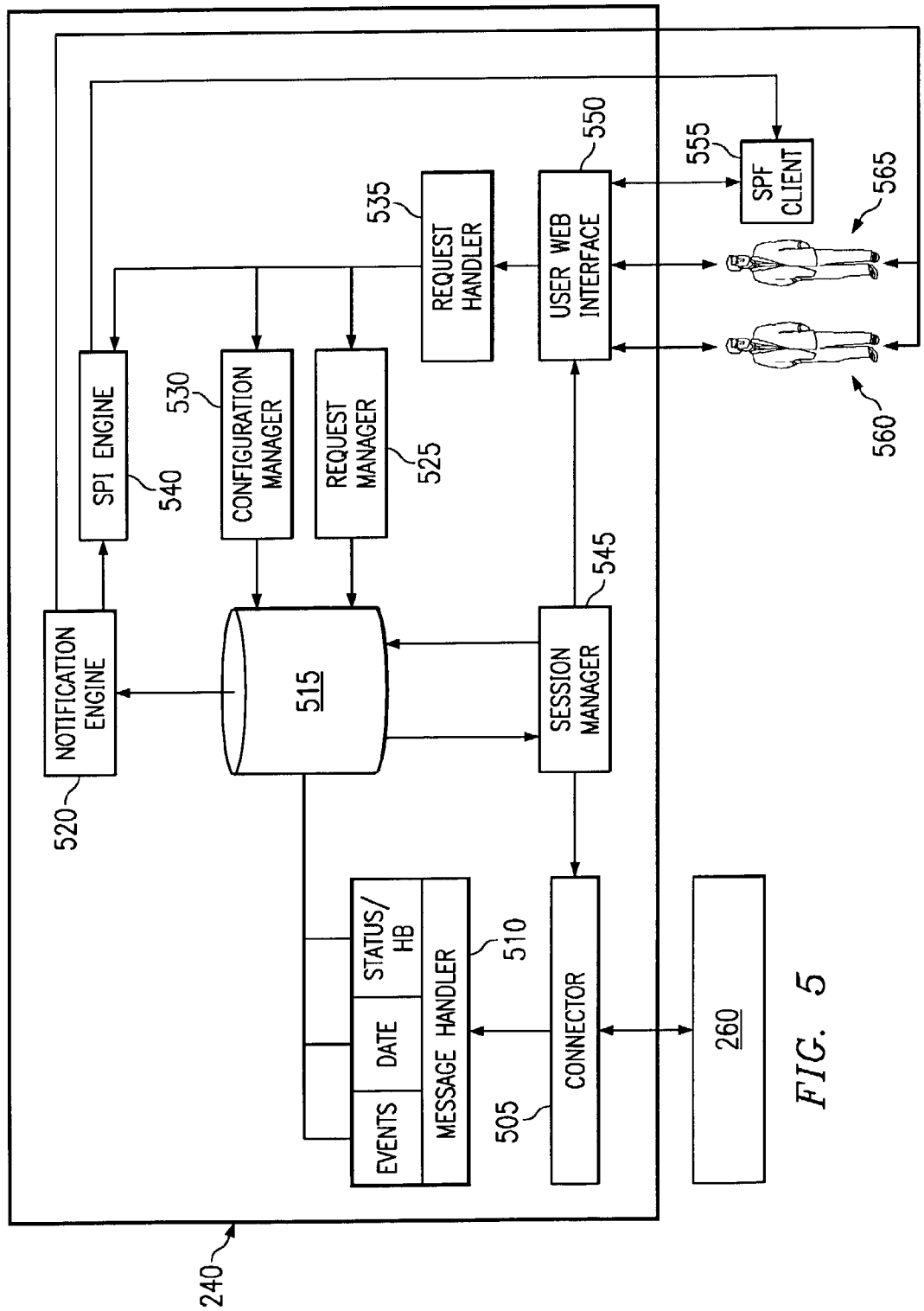
FIG. 5 is a diagrammatic representation of an architecture emphasizing the architecture of a portal program according to yet another embodiment of the present invention.

FIG. 5 is a diagrammatic representation of a system for secure communications including an embodiment of a software architecture for portal program 240. Portal program 240, in one embodiment of the present invention, can include a remote program connector 505, a message handler 510, a portal database 515, a notification engine 520, a report manager 525, a configuration manager 530, a request handler 535, a service provider interface ("SPI") engine 540, a session manager 545 and a user web interface 550. In operation, remote program connector 505 can receive data messages, status messages and/or heartbeat messages from remote program 260 over a connection initiated by remote program 260. Additionally, remote program 260 can maintain the connection until a reply message, if any, is sent back to remote program 260 in response to first message received from remote program 260. While only one remote program 260 is illustrated in FIG. 5, it should be noted that remote program connector 505 can receive first messages (e.g., data, status or heartbeat messages) from multiple remote programs. Message handler 510 can determine the message type and determine if a data message simply contains data collected by remote program 260 or contains one or more events. Message handler 510 can store the received messages at portal database 515 (or other storage mechanism, such as a file, as would be understood by those of ordinary skill in the art). If a message includes an event, notification engine 520 can send an alert or notification to an end user 560 or a systems administrator 565 associated with LAN 280 by, for example, email or pager. Notification engine 520 can also forward the event to SPI engine 540, which can act as an application program interface ("API") between portal program 240 and client programs (e.g., SPI client 555).

In one embodiment of the present invention, users, such as end user 560 and systems administrator 565, or client programs, such as client 555, can access portal program 240 through user web interface 550 using, for example, a web browser. The end user 560, client 555, or system administrator 565 can then request reports be generated from the data at portal database 515 or can send configuration control changes to portal program 240. If a report is requested, report manager 525 can establish rules for gathering the appropriate information from portal database 515, and session manager 545 can gather the data, format the data into a report (e.g., as an easily readable HTML page) and send the report to end user 560, client 555 or systems administrator 565 through user web interface 560 (e.g., as a web page). Additionally, report manager 525 can establish rules to generate periodic reports (e.g., daily, weekly, etc.).

If client 555, end user 560 or systems administrator 565 forwards configuration control information to portal program 240, configuration manager 530 can store the new configuration information at portal database 515. When a data message, heartbeat message or status message is received from remote program 260, session manager 545 can retrieve the new configuration control information from portal database 515 and forward the configuration control information to remote program connector 505. Remote program connector 505 can format a reply message in response to the data message, heartbeat message or status message that can include the new configuration control information. In the preferred embodiment of the present invention, the reply message is transmitted according to the same one-way protocol that was used to transmit the data message, heartbeat message or status message. To more efficiently utilize bandwidth, remote program connector 505 can format the configuration control message as XML commands, though, as would be understood by those of ordinary skill in the art, any format compatible with the one-way protocol can be used.

Because portal program 240, in one embodiment of the present invention, can be accessed through the world wide web (e.g., via user web interface 550), end user 560, systems administrator 565 or SPI client 555 can forward new configuration control information to portal program 240 from almost anywhere in the world. Thus, remote program 260 can be updated with new configuration control information even if the end user 560, system administrator 565 or client 555 do not have direct access to the computer on which remote program 260 is located (e.g., remote computer 220). Moreover, since portal program 240 communicates configuration control information to remote program 260 in reply to requests received from remote program 260 according to a one-way protocol (e.g., HTTP), portal program 240 essentially utilizes an outgoing connection with respect to remote program 260 to communicate configuration control information to remote program 260. This allows portal program 240 to utilize the existing network architecture of global computer network 225, without the use of leased lines or dial-up connections, to communicate configuration control information, and allows that configuration control information to be passed through a firewall without requiring a VPN and typically without any reconfiguration of the firewall.

Figure 6:
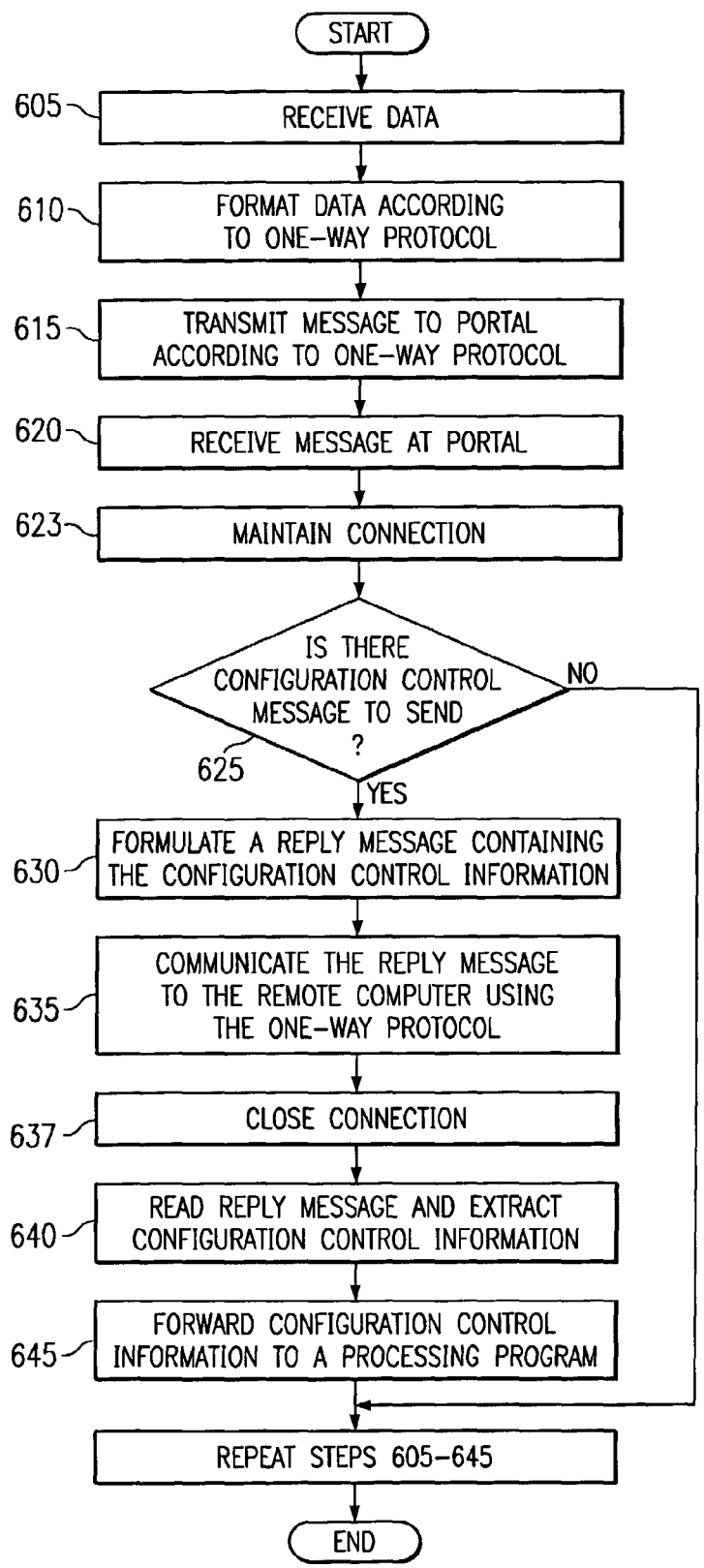
FIG. 6 is a flow chart illustrating one method for secure communication with a remote software agent according to one embodiment of the present invention.

FIG. 6 illustrates a flow chart for a method of secure communication according to one embodiment of the present invention. At step 605 a messaging program can receive data (e.g., such as monitoring data) from a processing program (e.g., such as a remote monitoring agent) and, at step 610, can format the data according to a one-way protocol. The messaging program can then transmit the data message to a portal computer according to the one-way protocol (step 615). In the preferred embodiment of the present invention HTTP or HTTPS can be used as the one-way protocol. As would be understood by one of ordinary skill in the art, sending a message according to the HTTP or HTTPS protocol can initiate a connection between the remote computer and the portal computer, typically over a socket in port 80 for HTTP or 443 for HTTPS. The portal computer can receive the data message (step 620), maintain the connection established by the remote computer (step 623) and, at step 625, determine if configuration control information (or any other information) should be sent to the remote computer. If configuration control information should be sent to the remote computer, the portal computer can formulate a reply message containing the configuration control information and/or other information (step 630) and transmit the reply message to the remote computer (step 635) according to the one-way protocol over the connection initiated by the remote computer. At step 637, the portal computer can close the connection. The messaging program at the remote computer can read the reply message and extract the configuration control information (step 640). The messaging program can then forward the configuration control information to a processing program, such as a remote monitoring agent, at step 645.

In addition to formulating and transmitting data messages, the messaging program at the remote computer can also formulate and transmit other messages such as heartbeat messages according to the one-way protocol. The portal computer can send reply messages that contain configuration control information in response to the heartbeat messages. This can allow the portal computer to send configuration control information to the remote computer even if the remote computer did not send a data message to the portal computer. Moreover, if the portal computer does not receive a heartbeat message at a scheduled time, the portal computer can alert an end-user or systems administrator that there may be a connectivity problem with the remote computer, or at least the messaging program located at the remote computer.

Additionally, the messaging program can send status messages to the portal computer according to the one-way protocol. In one embodiment of the present invention, status messages can be used to send registration information, state information and information regarding the initialization and termination of the messaging program. Again, if there is configuration control information to be sent to the remote computer, the portal computer can send the configuration control information in a reply message sent in response to a status message.

In summary, a messaging program at a remote computer can send a first message (e.g., a data message, a heartbeat message, status message and/or another message) to a portal computer according to a one-way protocol such as HTTP. A portal program at the portal computer can receive the first message and maintain the connection over which the first message was received. The portal computer can also determine if configuration control information should be sent to the portal computer. If so, the portal computer can generate a reply message that includes the configuration control information and send the reply message to remote computer over the connection established by the remote computer. In this manner, the portal computer can send configuration control information to the messaging program without requiring leased lines, dial-up connections or a VPN. Moreover, since the communication according to the one-way protocol was initiated at the remote computer, a firewall will typically allow the remote computer to receive the reply message.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for the communication of information to a remote software program comprising a set of software instructions stored on a computer readable storage medium and executable by a computer processor to:
   receive a request comprising monitoring data, from a remote computer, wherein the request adheres to a one-way protocol, wherein the monitoring data comprises information collected from one or more of a set of networked computers in communication with a remote software agent executing at the remote computer, and wherein the monitoring data is formatted according to the one-way protocol, is transmitted with the request, wherein a connection between the remote computer and a portal computer is established by the remote agent on the remote computer;
   determine, at the portal computer, if configuration control information should be sent to the remote agent on the remote computer based on the monitoring data received from the remote agent on the remote computer;
   compose, at the portal computer, a response according to the one-way protocol, wherein, if the portal computer determines that configuration control information should be sent to the remote software agent on the remote computer, the response includes configuration control information for configuring the remote software agent on the remote computer;
   send the response from the portal computer, to the remote agent on the remote computer according to the one-way protocol over the connection; and
   close the connection, by the portal computer, after the response is sent to the remote agent on the remote computer, wherein the remote agent on the remote computer is operable to extract the configuration control information from the response and configure the remote software agent based on the configuration control information sent by the portal computer.

2. The system of claim 1, wherein the remote software agent monitors the set of networked computers based on a set of configuration control information.

3. The system of claim 2, wherein the configuration control information is altered based on the monitoring data received in the response and the remote software agent monitors the set of networked computers based on the altered configuration control information.

4. The system of claim 2, wherein the set of configuration control information comprises a collection schedule or a reporting schedule.

5. The system of claim 2, wherein the set of configuration control information is operable to configure the remote software agent to process the information collected from one or more of the set of networked computers.

6. The system of claim 5, wherein the request comprises the processed information.

7. The system of claim 1, wherein said one-way protocol is one of HTTP or HTTPS.

8. The system of claim 7, wherein said remote software agent is a remote monitoring agent.

9. The system of claim 7, wherein said request is one of a data message, a heartbeat message or a status message.

10. The system of claim 7, wherein said request is communicated over a commonly open port in a firewall.

11. The system of claim 7, wherein said remote software agent is operable to communicate a heartbeat message according to said one-way protocol on a predetermined schedule and wherein said reply message is sent in accordance with said one-way protocol to said remote software program in response to said heartbeat message.

12. The system of claim 11, wherein said remote software agent is further operable to increase a frequency of subsequent heartbeat messages according to said configuration control information contained in said reply message.

13. The system of claim 7, wherein the request is sent according to a predefined schedule.

* * * * *